United States Patent Office 3,201,257
Patented Aug. 17, 1965

3,201,257
EGG ALBUMIN COMPOSITIONS
Ray C. Hamon, St. Albans, W. Va., assignor to Union Carbide Corporation, a corporation of New York
No Drawing. Filed Jan. 17, 1963, Ser. No. 252,066
6 Claims. (Cl. 99—113)

The present invention relates to stabilized egg albumin foams. More particularly, the present invention relates to egg albumin compositions having improved whipping qualities and to the whipped foams prepared therefrom.

Egg albumin is used as a binder in cakes, candies, and other food products. Until recently, the egg albumin was utilized either by including the whole egg in the recipe or by separating the yoke from the egg white and using only the latter. More recently, it has become convenient to work with dried egg white, to which water can be added as desired.

It is customary in many food products, such as cakes, candies, and other blended recipes, to prepare a stiff foam of egg albumin as the first step, by whipping either the whole material or the dried material to which water has been added. The other ingredients of the recipe then are added to this foam carefully. The lightness of the end product depends on the ability of the foam to maintain its body.

Additionally, it is sometime necessary to compound another portion of the recipe before adding it to the albumin foam. In such cases it is desirable to prepare the albumin foam first, compound the other portion of the recipe and then combine the two ingredients. In such cases, however, unstabilized albumin foam loses some of its body on standing and consequently the resulting products have undesirable characteristics.

Since the lightness of the end product depends on the ability of the foam to maintain its body and since unstabilized foams revert to liquid quite rapidly, additives have long been sought which would improve the stability of egg albumin foams without interfering with the whippable qualities of the egg albumin compositions. To be of practical importance, of course, additives for accomplishing their results must be edible, substantially tasteless, and also must not unduly interfere with the normal storage and use of egg albumin. Heretofore, no satisfactory additives conforming to all these requirements have been known.

In a broad aspect, the present invention is directed to compositions which comprise egg albumin and a stabilizing amount of a water-soluble, resinous alkylene oxide polymer. By the term "stabilizing amount" as employed throughout the specification and appended claims is meant that amount which when added to the egg albumin compositions is sufficient to enhance the whipping quality and maintain the body of the foam without adversely affecting the texture or taste of the product itself or compositions containing the same.

Such stabilized compositions, whether formed by the addition of the water-soluble, resinous alkylene oxide polymer to the egg whites or to whole eggs, or whether produced by adding the polymer to a water solution of dried egg albumin, are not only more easily whipped than the untreated compositions but also result in improvements in various qualities of the foam obtained therefrom, such as their strength, stability, texture, and ability to hold flour, sugar, and the like materials which are folded into the foams in the course of preparing various food products.

The water-soluble, resinous alkylene oxide polymers of this invention can be conveniently characterized by their "solution viscosity." Unless otherwise indicated, by the term "solution viscosity" as used herein it is meant the viscosity of an aqueous solution containing 5 percent by weight of water-soluble, resinous alkylene oxide polymer at a temperature of 25° C. The preferred water-soluble, resinous alkylene oxide polymers have a solution viscosity of at least about 200 centipoises. The particularly preferred polymers have a solution viscosity in the range of from about 200 to about 3000 centipoises. Another way of characterizing these polymers is by their molecular weight, that is, number-average molecular weight. Those deemed suitable have a number-average molecular weight of at least 50,000, and those deemed particularly suitable have a number-average molecular weight in the range of from about 50,000 to about 5,000,000, or higher.

In practice, it is desirable to employ from about 0.01 to about 10 weight percent, based on the weight of the egg albumin, of a water-soluble, resinous alkylene oxide polymer. Preferred concentrations are in the range of from about 0.5 to about 5 weight percent. Concentrations in the range of from about 0.5 to about 1.0 weight percent are highly preferred.

The water-soluble, resinous alkylene oxide polymers most suitable for use in the present invention are the water-soluble, solid poly(alkylene oxides), such as solid poly(ethylene oxide). Water-soluble copolymers composed of different alkylene oxides, such as ethylene oxide in copolymerized form with propylene oxide, are also suitable in the present invention. Of these copolymers, those preferred are the copolymers containing at least 50 weight percent of ethylene oxide in copolymerized form with up to 50 weight percent of a second lower olefin oxide, such as propylene oxide or butylene oxide.

The water-soluble, solid poly(ethylene oxides) are the preferred polymers of the present invention. They appear to form homogeneous systems in water in all proportions although the relatively higher molecular weight, solid poly(ethylene oxide) polymers merely swell on the addition of small amounts of water. On the addition of greater amounts of water, the polymers pass into solution. The water solutions are viscous, the viscosity increasing both with the concentration of the polymer in the solution and with the molecular weight of the polymer.

The polymers which have performed best in the practice of this invention are four grades of water-soluble, solid poly(ethylene oxide) having solution viscosities in the range of from about 225 to about 2500 centipoises in aqueous solutions of five weight percent polymer concentration at 25° C., and from about 2000 to about 5500 centipoises in aqueous solutions of one weight percent polymer concentration at 25° C.

The preparation of the water-soluble, resinous alkylene oxide polymers such as solid poly(ethylene oxide) and copolymers thereof, is the subject matter of U.S. Patents No. 2,866,761, 2,971,988, 2,987,489, and others.

The manner in which the polymers are admixed with the egg albumin or compositions containing the egg albumin does not appear to be critical and any of several means can be employed to effect such admixture. The water-soluble, resinous alkylene oxide polymers are preferably added to the egg albumin composition in the form of finely-divided granules or in the form of aqueous solutions. One skilled in the art can readily ascertain other suitable methods of addition.

The following examples are illustrative.

EXAMPLES 1–25

The cover of a small desiccator was converted into a mixing bowl by inverting it and inserting in the central plug a drain consisting of a capillary tube. A stop-cock was used to close off the drain. Melted paraffin wax was poured into the bowl and shaped as to divert any liquid formed into the drain. The wax also served to assure that the liquid formed would run off instead of clinging to the glass.

Egg albumin, purified powder, was used in Examples 1–25 for the preparation of the egg albumin compositions. The water-soluble, resinous alkylene oxide polymers used were various types of solid poly(ethylene oxide) polymer having the following solution viscosities.

*Polymer A.*—Solution viscosity of 5500 centipoises, or higher, in aqueous solutions of one weight percent polymer concentration at 25° C.

*Polymer B.*—Solution viscosity of 2000–4000 centipoises in aqueous solutions of one weight percent polymer concentration at 25° C.

*Polymer C.*—Solution viscosity of 1500—2500 centipoises in aqueous solutions of one weight percent polymer concentration at 25° C.

*Polymer D.*—Solution viscosity of 225–375 centipoises in aqueous solutions of five weight percent polymer concentration at 25° C.

The egg albumin compositions were prepared in the mixing bowl by forming a mixture of 10 grams of egg albumin in 90 grams of water. When the solid poly(ethylene oxide) polymer was added as an aqueous solution, the amount of water added as part of the polymer solution contributed to the total amount of 90 grams. The various Polymers A, B, C, and D were tested at concentrations of 0.5 and 1.0 weight percent, based on the weight of the dry egg albumin. The compositions thus prepared were carefully blended in the mixing bowl for a few seconds by hand and then mixed for two minutes using a twin-beater domestic mixer. After mixing, the resulting foam was allowed to set for twenty minutes. The liquid in the bottom of the mixing bowl then was drained off and measured with a graduated cylinder. The results of such tests are summarized in Table I, infra.

While a total mixing period of two minutes was observed for all compositions, it was further observed that compositions containing Polymer C and Polymer D, produced a stiff and firm foam after only one minute of mechanical mixing, and are, therefore, highly preferred. Furthermore, the foams containing the two aforementioned polymers appeared to have more firmness and strength than all other foams which were prepared. The pertinent data are set forth in Table I, infra.

*Table I.—Stabilized albumin compositions*

| Example No. | Water-Soluble, Resinous Ethylene Oxide Polymer Used | Weight of Water-Soluble Resinous Ethylene Oxide Polymer [1] | Amount of Liquid Collected [2] |
| --- | --- | --- | --- |
| 1 | None | | 28.6 |
| 2 | do | | 30.2 |
| 3 | do | | 23.6 |
| 4 | Resin A | 0.5 | 8.9 |
| 5 | do | 0.5 | 8.9 |
| 6 | do | 1.0 | 8.4 |
| 7 | do | 1.0 | 7.6 |
| 8 | Resin B | 0.5 | 3.4 |
| 9 | do | 0.5 | 6.2 |
| 10 | do | 1.0 | 8.6 |
| 11 | do | 1.0 | 8.0 |
| 12 | do | 0.5 | 4.4 |
| 13 | do | 0.5 | 3.6 |
| 14 | do | 1.0 | 2.0 |
| 15 | do | 1.0 | 4.2 |
| 16 | Resin C | 0.5 | 1.6 |
| 17 | do | 0.5 | 1.2 |
| 18 | do | 1.0 | 0.0 |
| 19 | do | 1.0 | 0.9 |
| 20 | Resin D | 0.5 | 1.4 |
| 21 | do | 0.5 | 2.1 |
| 22 | do | 1.0 | 1.2 |
| 23 | do | 1.0 | 1.4 |
| 24 | do | 0.5 | 3.0 |
| 25 | do | 1.0 | 0.6 |

[1] Percent based on weight of albumin present.
[2] Amount of liquid collected after 20 minutes, in cubic centimeters, as a measure of stability of the foam.

With reference to Table I, the amount of liquid collected from the mixing bowl was a measure of the stability of the composition comprising the polymer and the albumin. The less the amount of liquid collected, the more stable was the composition. For example, in Table I, Example 18, it can be seen that the composition containing 1.0 percent by weight of Polymer C and albumin resulted in a completely stabilized composition, as shown by the absence of any collected liquid.

EXAMPLE 26

I. A first solution was prepared by dissolving 20 grams of dry egg albumin in 180 grams of distilled water. This was placed in a Kidde Whip cylinder (Model 8) and pressurized with 100 lbs./sq. in. of carbon dioxide gas. The solution was shaken vigorously by hand for 30 seconds, then allowed to stand for ten minutes. The contents of the cylinder were then discharged into a 16-oz. widemouth jar, forming a copious foam. The foam in the jar was observed and was found to revert completely to the liquid state in ten minutes.

II. A second solution was prepared, identical with the first except for the addition of one gram of dry water-soluble, resinous ethylene oxide polymer having a solution viscosity, measured at a polymer concentration of one weight percent and a temperature of 25° C., of 2000–4000 centipoises (Polymer B).

This solution was tested in the same manner as the first solution. It was noted that it required eighteen minutes for the foam to lose 50 percent of its volume and twenty-seven minutes to revert completely to liquid.

The foam in each solution was still and firm at the beginning of the test. It was thus demonstrated that an egg albumin foam discharged from a pressurized can would retain its body longer if a small quantity of water-soluble, resinous ethylene oxide polymer were present.

EXAMPLE 27

I. Solution (A) was made by dissolving 8 grams of dry egg albumin in 25 grams of distilled water. The mixture was then whipped by hand with a 1-inch wide 8-inch spatula. It required fifteen minutes to produce a firm, stiff foam.

II. Other solutions were prepared as follows:

Solution (B) in which there was 8 grams of albumin, 0.25 gram of water-soluble, resinous ethylene oxide polymer having a solution viscosity, measured at a polymer concentration of one weight percent and a temperature of 25° C., of 2000–4000 centipoises (Polymer B), and 24.75 grams of water, the polymer being added as an aqueous solution, and Solution (C) in which there was 8 grams of the albumin, 0.20 gram of a water-soluble, resinous ethylene oxide polymer having a solution viscosity, measured at a polymer concentration of one weight percent at 25° C., of 2000–4000 centipoises (Polymer B), and 25 grams of water, the polymer being added in dry form. Both Solutions (B) and (C) were hand-whipped in the same manner as Solution (A). Solution (B) yielded a firm, stiff foam in three minutes; and Solution (C) yielded a stiff, firm foam in five minutes.

EXAMPLE 28

Two batches of "divinity" candy were prepared as follows:

On both batches, a sucrose solution was made by mixing 200 grams of sucrose, 50 grams of "Karo" brand syrup, and 50 grams of distilled water in a container.

A first sucrose solution was heated on a hot plate to a constant heat of 125° C. to drive off the water. When the temperature reached constant heat, it was cut off, and the sucrose solution was allowed to stand.

Immediately upon cutting the heat under this sucrose solution, an albumin foam was prepared using 8 grams of dry egg albumin, and 25 grams of distilled water. The foam was prepared in a mixing bowl, using an air motor and a large stirrer of shape similar to that of stirrers used with domestic electric mixers. The motor was set to operate at a speed of 750 r.p.m. It took fifteen minutes to obtain a stiff foam. By this time, the sucrose solution had stiffened considerably. The sucrose solution was reheated, but it showed definite signs of crystallization, even when hot. The hot sucrose solution was added to the albumin foam, while beating the albumin foam as before. When the mixture containing the sucrose solution and the albumin foam reached the point where it just barely flowed, about 5 grams of vanilla extract was added for flavor. The candy was found to have a grainy and lumpy texture.

Following the above procedure, a second sucrose solution was prepared. Then, when the heat was cut back, a mixture was prepared from 8 grams of dry egg albumin and 25 grams of a one weight percent aqueous solution of a water-soluble, resinous ethylene oxide polymer having a solution viscosity of from 2000–4000 centipoises (Polymer B), as measured at a polymer concentration of one weight percent at 25° C. This mixture was shipped in the same manner as the albumin foam prepared for the first sucrose solution, resulting in a stiff foam in three minutes. The sucrose solution, which was still hot and fluid, was immediately poured into the albumin foam with whipping. The procedure from here on duplicated that used in the preparation of the above batch of candy using the first sucrose solution. The candy, when cooled, was found to have a smooth and light texture.

Thus, it is apparent that critical blending operations, such as needed in combining the sugar solution and the albumin foam in this instance can be minimized if a water-soluble, resinous alkylene oxide polymer is included in the formula.

The water-soluble, resinous alkylene oxide polymers of the present invention have been tested in animals for toxicity.

EXAMPLE 29

Water-soluble resinous ethylene oxide polymer having a viscosity of from about 225 to about 375 centipoises in aqueous solution of five percent concentration at 25° C. (Polymer D), was blended into ground Purina laboratory chow and incorporated in the diet of rats at dosage levels of 5.0, 2.0 and 0.8 percent by weight, based upon the weight of the chow, for a period of 89 to 90 days. Groups of ten male and ten female albino rats were maintained at each of the above three dosage levels. At the conclusion of the test period the surviving rats were killed and exsanguinated by sectioning the cord and neck vessels without cutting the trachea. They were then suspended by their tails until heart action had ceased. Thoracic and abdominal organs were examined for gross pathology and liver and kidneys of each rat were removed and weighted. None of the criteria of effect were deleteriously altered as compared with ten male and ten female albino rats which did not receiver Polymer D in their diet, but only ground Purina laboratory chow. These included appetite, mortality, liver and kidney weight and and weighed. None of the criteria of effect were de- micropathological examination of sections of the lung, liver and kidney. It was concluded that the rats can tolerate, without ill-effect, at least 5.0 percent by weight of water-soluble, resinous ethylene oxide polymer in their diets.

EXAMPLE 30

Water-soluble, resinous ethylene oxide polymer having a viscosity of from about 2000 to about 4000 centipoises in aqueous solution of one percent concentration at 25° C. (Polymer B), was incorporated in the diet of dogs at dosage levels of 2.0, 0.8 and 0.32 percent by weight, based upon the weight of the basic diet for a period of two years. Groups of six beagle dogs, four male and two female per group, were treated with 2.0, 0.8 and 0.32 percent by weight, based upon the weight of the basic diet, of Polymer B in their diets for two years, while a similar control group received identical treatment and the basic diet, but without the inclusion of Polymer B. The basic diet of all of the dogs was Friskies Dog Food Meal.

After completion of two years of dosing the dogs with Polymer B, they were weighed, anesthetized with pentobarbital sodium, exsanguinated and liver and both kidneys were removed from the dogs and weighed individually. Tissue samples were taken for histo-pathological interpretation from lung, liver, kidney, pancreas, heart, trachea, cholecyst, stomach, small intestine, large intestine, spleen, thyroid, parathyroid, urocyst, testisprostate or uterus-ovary-vagina, adrenal, brain, pituitary sciatic nerve, esophagus, artery, lymph node, from the control and exposed dogs. The following criteria of effect were examined: body weight change, mortality, terminal liver and kidney weights, periodical hemotological and biochemical determinations, and microscopic examination of tissue from all major organs. In none of these criteria of effect did the 2.0 percent by weight of Polymer B dosed dogs differ significantly from the controls.

It is believed that the above test data demonstrates the lack of toxicity of the water-soluble resinous alkylene oxide polymers of this invention.

What is claimed is:

1. A composition of matter comprising egg albumin and a stabilizing amount of a water-soluble, solid poly(ethylene oxide) selected from the group consisting of: (a) poly(ethylene oxide) having a solution viscosity of at least about 225 centipoises in aqueous solutions of 5 weight percent said poly(ethylene oxide) concentration at 25° C.; and (b) poly(ethylene oxide) having a solution viscosity of at least about 2000 centipoises in aqueous solutions of 1 weight percent said poly(ethylene oxide) concentration at 25° C., incorporated therein.

2. A composition of matter comprising egg albumin and from about 0.01 to about 10 weight percent, based on the weight of the egg albumin, of a water-soluble, solid poly(ethylene oxide) having a solution viscosity of from about 225 to about 2500 centipoises in aqueous solutions of 5 weight percent said poly(ethylene oxide) concentration at 25° C., incorporated therein.

3. A composition of matter comprising egg albumin and from about 0.01 to about 10 weight percent, based on the weight of the egg albumin, of a water-soluble, solid poly(ethylene oxide) having a solution viscosity of from about 2000 to about 5500 centipoises in aqueous solutions of 1 weight percent said poly(ethylene oxide) concentration at 25° C., incorporated therein.

4. A composition of matter comprising egg albumin and from about 0.5 to about 1.0 weight percent, based on the weight of the egg albumin, of a water-soluble, solid poly(ethylene oxide) having a solution viscosity of from about 225 to about 375 centipoises in aqueous solutions of 5 weight percent said poly(ethylene oxide) concentration at 25° C., incorporated therein.

5. A composition of matter comprising egg albumin and from about 0.5 to about 1.0 weight percent, based on the weight of the egg albumin, of a water-soluble, solid poly(ethylene oxide) having a solution viscosity of from about 1500 to about 2500 centipoises in aqueous solutions of 5 weight percent said poly(ethylene oxide) concentration at 25° C., incorporated therein.

6. A method for improving the whipping properties of a composition containing egg albumin as its main whippable ingredient which comprises incorporating in said composition from about 0.01 to about 10 weight percent, based on the weight of the egg albumin, of a water-soluble, solid poly(ethylene oxide) selected from the group consisting of: (a) poly(ethylene oxide) having a solution viscosity of at least about 225 centipoises in aqueous solutions of 5 weight percent said poly(ethylene oxide) concentration at 25° C.; and (b) poly(ethylene oxide) having a solution viscosity of at least about 2000 centipoises in aqueous solutions of 1 weight percent said poly(ethylene oxide) concentration at 25° C., incorporated therein.

References Cited by the Examiner

UNITED STATES PATENTS

| | | | |
|---|---|---|---|
| 2,183,516 | 12/39 | Mink | 99—210 |
| 2,569,527 | 10/51 | Johnston | 99—92 |
| 2,870,101 | 1/59 | Stewart | 260—2 |

FOREIGN PATENTS 784,659   10/57   Great Britain.

OTHER REFERENCES

"Carbowax Polyethylene Glycols," published by the Union Carbide Co., N.Y., 1958, 58 pages.

A. LOUIS MONACELL, *Primary Examiner.*